United States Patent Office 3,193,915
Patented July 13, 1965

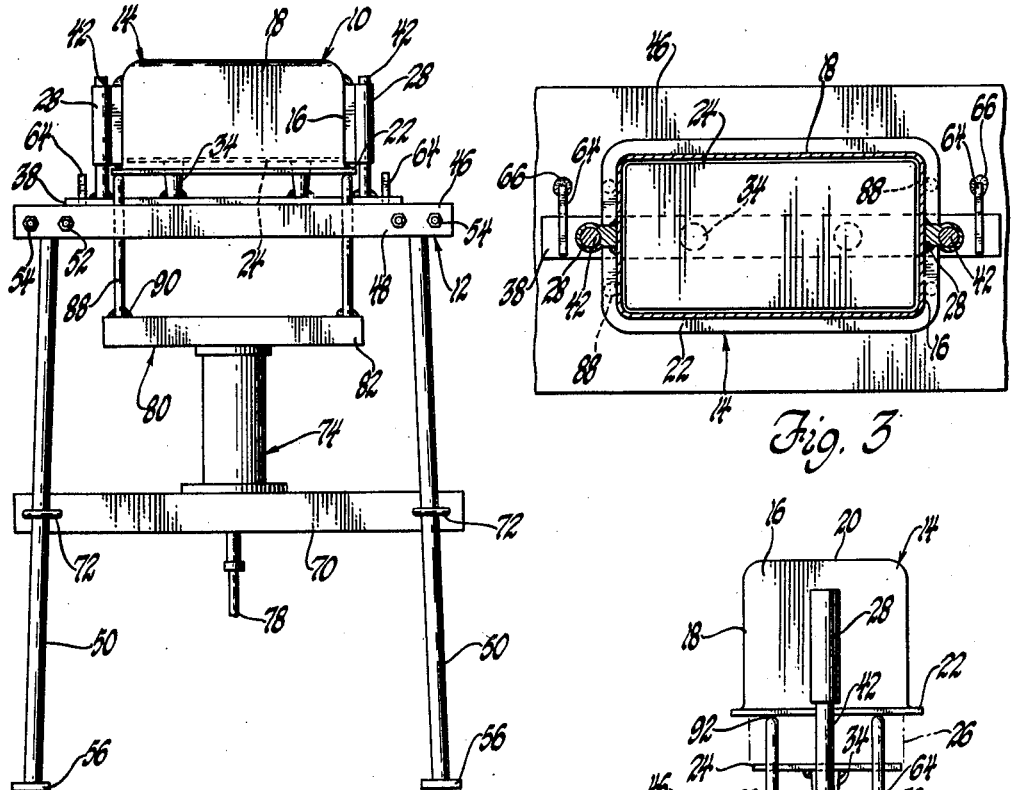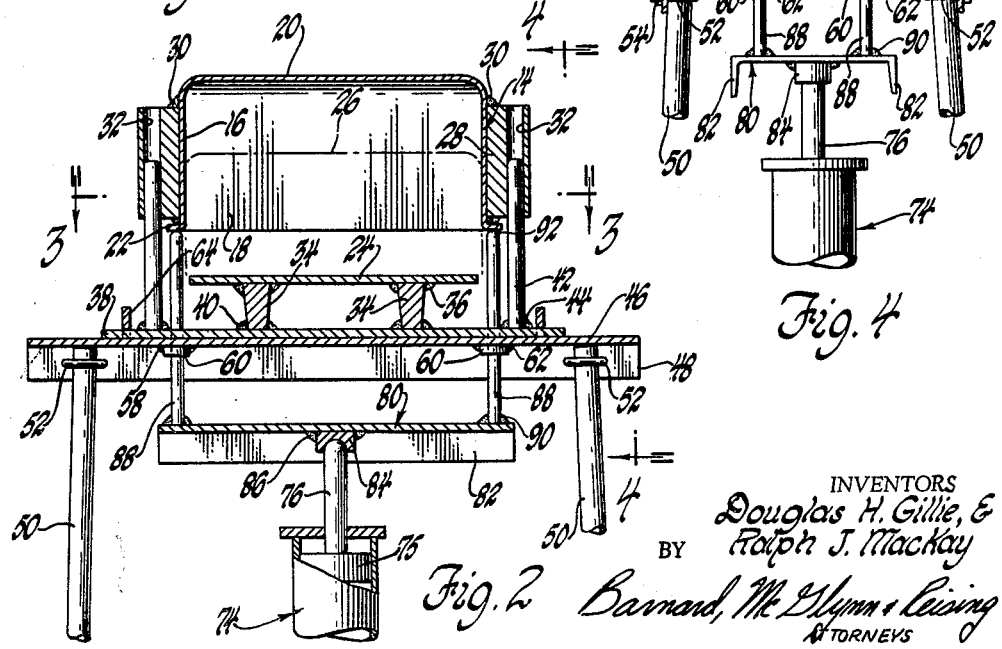

3,193,915
MOLD SEPARATING DEVICE
Douglas H. Gillie, 26680 Woodmont, Roseville, Mich., and Ralph James MacKay, 15420 Fairmount, Detroit, Mich.
Filed Oct. 3, 1963, Ser. No. 313,497
12 Claims. (Cl. 29—239)

This invention relates to mold separating devices and more particularly to a structure for separating a two-part mold assembly wherein one part is received within the other part during the molding process and must be removed therefrom following the molding process.

In many situations where a two-part mold assembly is used, with one of the mold parts being received within the other mold part, it is extremely difficult to separate the parts after the molding operation. For example, in the ham processing industry it is common to use a two-part mold, including a pan and a cover, to cook the ham and form it into the desired shape. Usually, in the cooking process, the ham is deboned and is placed into the mold pan with the cover placed on top. The mold and ham are then cooked. The cover moves into the pan, compensating for shrinkage as the ham is cooked, and pressing the ham into the desired shape. Following the cooking operation, the mold assembly and ham are cooled and the mold must then be separated. It is exceedingly difficult to separate the mold cover from the mold pan at this stage, due primarily to the vacuum within the mold created by the cooling process following the cooking.

In the past it has been common to separate the mold cover from the mold pan by a hand operation. In other words, the operator applied a tool to the mold cover member and pried it loose from the ham and from the mold pan. It has been found that this is an extremely difficut and messy operation as juices and the like released as a part of the cooking process cause the cover to stick to the ham and to the pan. Further, the vacuum created by the cooling process requires considerable force to remove the cover member from the pan.

The device in which this invention is embodied comprises, generally, a support on which the mold pan and cover assembly may be secured. The mold assembly is attached by means of a bar extending across the cover member and separated therefrom to permit movement of the cover member into the pan during the cooking operation. A pair of hooks or like means extend from the support and engage the bar. Beneath the support is a movable member having a plurality of rods extending therefrom and through the support to engage the mold pan. The movable member is actuated by any suitable means, such as an hydraulic cylinder, to raise the movable member and engage the rods with the mold pan. Further movement of the movable member causes the pan to separate from the support and from the cover, thus releasing the cover from the mold. Generally, the ham cooked therein will remain on the cover member; or, if it remains in the mold pan, it is easily removed from the mold pan.

A device of this general description is exceedingly simple and uncomplicated to use and may be easily manufactured. The saving in time and labor over the old hand method of removing cover members makes the use of this device extremely efficient and economical. The device may be made such that different size mold assemblies are easily accommodated and the device is simple to operate. There are a very few moving parts, thus requiring little or no service or replacement of parts due to wear as the life of the device increases. The device is of such construction that it may be easily maintained in a clean condition so as not to adversely affect the meat cooking process or to affect the meat as the device is used.

These and other advantages will become more apparent from the following description and drawing in which:

FIGURE 1 is an elevational view of the mold separating device with a mold assembly placed thereon.

FIGURE 2 is a cross sectional view of the mold separating device of FIGURE 1, illustrating the position of the various parts when the mold assembly is separated.

FIGURE 3 is a plan view, partly in section, of the mold separating device, taken substantially along the line 3—3 of FIGURE 2 and looking in the direction of the arrows.

FIGURE 4 is a side view, partially in section, of the mold separating device illustrated in FIGURES 1 and 2 and taken substantially along the line 4—4 and looking in the direction of the arrows.

Referring more particularly to the drawings, a mold assembly, illustrated generally by the numeral 10, is shown in the various figures mounted on the separating device, illustrated generally by the numeral 12. Mold assembly 10 is a two-part mold, part of which is a mold pan, illustrated by the numeral 14. Mold pan 14 is preferably of generally rectangular shape but may be formed of any other convenient shape depending upon the desired end result. Pan 14 includes side and end walls 16 and 18, respectively, and a bottom wall 20. Extending outwardly from the peripheral edge of the pan 14 and opposite the end wall 20 is a flange 22. The purpose for flange 22 will become more apparent as the description proceeds.

The cover member of the mold assembly, illustrated by the numeral 24, is a plate-like member and of substantially the same size as the pan 14. It is preferred that the cover 24 be receivable within the side walls 16 and end walls 18 so that as the ham, illustrated in dashed and dotted lines at 26, is processed and shrinks in size, the cover 24 will settle into the pan 14. The cover may be allowed to settle of its own weight as the ham 26 is cooked, or suitable springs (not shown) may be conveniently attached between the cover 24 and the pan 14 in a well known fashion to accomplish this purpose.

Attached to the exterior surfaces of end walls 16 of the pan 14 are guide members 28. Guide members 28 may be secured to the pan 14 in any suitable manner, as by weldments 30. Extending longitudinally through the guide members 28 are bores 32, the purpose for which will become hereinafter more apparent.

Extending from the cover member 24 and in a direction away from the pan 14 are pedestals 34 secured to the cover 24 in any suitable manner, as by welding 36. Pedestals 34 are secured at their opposite ends to a bar 38 extending transversally of the cover 24 and spaced therefrom by the pedestals 34. The ends of the bar 38 extend beyond the limits of the cover member 24 and beyond the limits of the peripheral flange 22 formed on the pan 14. The bar 38 may be secured to the pedestals 34 in any suitable manner as by weldments 40.

At generally right angles from the bar 38 extend guide pins 42, secured to the bar in any convenient manner, as by weldments 44. Guide pins 42 are received in the bores 32 formed in the guide blocks 28 secured to the pan 14. The use of the guide pins 42 and the guide blocks 28 assures that the cover 24 will be separated as evenly as possible from the pan 14 so as not to injure the ham 26 during the separating operation. Limited clearance may be provided between the guide pin 42 and the bores 32 to permit a slight amount of misalignment of the pins relative to the bores 32 since the ham may cause a certain amout of misalignment as the mold parts are separated. This could be caused by the ham sticking to the sides or ends of the mold pan 14 as the mold pan is withdrawn. The flexibility of the ham 26 may also tolerate a slight amount of angular misalignment.

In order to support the mold assembly 10 during the separating operation, the separating device 12 is shown in the drawings to include an upper support surface or plate 46. Plate 46 has downwardly depending flanges 48 adjacent its edges to which are secured the legs 50 in any suitable manner, as by U-bolts 52 and nuts 54. Legs 50 may be provided with feet 56 to stabilize the construction and to prevent unevenness or rocking of the device as it is used.

Support plate 46 receives the mold assembly 10 in its inverted position, that is, with the cover member 24 adjacent the plate 46; and the plate is provided with a plurality of apertures 58, so disposed as to underlie the peripheral flange 22 formed on the mold pan 14. Disposed on the under surface of the support plate 46 may be a plurality of bushings 60, secured thereto in any convenient manner as by weldments 62. The purpose for the bushings and apertures will become hereinafter more apparent.

On the upper surface of support plate 46 are secured a pair of hook members 64, positioned outwardly of the mold assembly 14. Hook members 64 are secured to the plate 46 in any suitable manner, as by welding 66, and provide a gap or groove 68 between the table surface 46 and the body hook 64. The bar 38 is received underneath the hooks 64 and in the recesses 68 to secure the bar 38 against the plate surface 46 during the separating operation.

Secured across the legs 50 and spaced from the table top 46 is a second support member, illustrated generally by the numeral 70. Support member 70 is attached to the legs 50 in any suitable manner, as by similar U-bolts 72 and suitable nuts, not shown. Mounted on the support member 70 is a conventional actuating means, such as pressure cylinder 74. Pressure cylinder 74 contains a piston 74 in the usual manner and from which extends a piston rod 76. At the lower end of cylinder 74 is a suitable connecting conduit 78 which may be connected to a convenient pressure source, not shown.

Secured to the outwardly extending end of piston rod 76 is a movable member, illustrated generally by the numeral 80. Movable member 80 may be provided with downturned edges 82 for strengthening purposes if desired, and a sleeve 84 is secured to the under side of movable member 80 in any convenient manner, as by welding 86. The upper end of rod 76 is rounded so as to be received in the sleeve 84 and provide limited universal motion of the movable member 80 relative to the rod 76. This permits a certain amount of angular misalignment to be compensated for or tolerated as the piston is raised.

Secured to the upper side of movable member 80 are a plurality of rods 88 secured to the movable member in any suitable manner, as by welding 90. Rods 88 extend through the bushings 60 and the apertures 58 in the support plate 46 and engage the flange 22 formed on the mold pan 14. The rods 88 may have rounded ends as at 92 to permit a generally upward force at all times regardless of the limited misalignment between the mold pan 14 and the support plate 46.

The operation of the mold separating device is as follows: With the mold pan and cover assembly 10 containing the newly cooked ham 26 placed in an inverted position as shown in FIGURE 1, the bar 38 is placed under the hooks 64 on the plate 46. This secures the mold assembly to the support structure 12. The operator then actuates the cylinder 74, applying pressure thereto to move the piston outwardly of the cylinder. Piston rod 76 forces the movable member 80 upwardly with the rods 88 engaging the peripheral flange 22 on the mold pan 14. Continued upward movement of the movable member 80 and the rods 88 separates the mold pan 14 from the cover member 24 which is held in place on the support plate 46 by the hooks 64. Once the cover plate 24 separates from the mold 14 the vacuum created by the cooling process will be released, and it will be a relatively simple matter to lift the pan 14 from the cover 24. If desirable, a suitable draft or angularity may be provided on the side and end walls 18 and 16 of the mold pan 14 so that the ham 26 will easily separate from the side and end walls of the pan 14.

Should the ham 26 stick to any of the side or end walls 18 and 16, so as to cause angular misalignment or drag on one wall of the pan 14 as it is pushed away from the cover 24, the clearance between the guide pins 42 and bores 32 will permit a limited amount of such angular misalignment. The ball and socket type connection between the piston rod 76 and the movable member 80 will permit the movable member to angulate slightly and to continue the directly upward force of the rods 88 on the pan 14.

It will be appreciated that if desired, some means may be provided to properly position the mold pan and cover assembly 10 relative to the top surface of the support plate 46. Such means may take any convenient form such, for example, as the precise placement or location of the hook members 64. Hook members 64 may be so spaced as to limit the location of the assembly relative to the surface plate 46. The hooks 64 may be located to abut or engage various parts of the assembly and thus prevent lateral misplacement of the assembly on the surface 46 which would impede the engagement of the rod 88 with the flange 22. For example, hooks 64 may engage the tubular members 28 or may engage the guide rods 42, whichever is desirable. Alternatively, the weldments 44 may be used to space the pan and cover assembly 10 between the hooks 64. In order to properly locate the assembly 10 in the crosswise direction, the grooves 68 formed between the hooks 64 and the top surface 46 may be dimensioned to locate the bar 38 relative to the hooks by such dimension. When the bar 38 is pushed under the hooks 64 and into the grooves 68 to the stopping point, the assembly 10 will then be properly positioned relative to the rods 88 and the engagement of the rods with the flange 22. Any other such positioning means may be suitably incorporated in the device.

Should it be desired to use different size mold assemblies, the movable member 80 may be exchanged for a similar member having rods 88 more conveniently spaced for the mold pan used. The plate 46 may be provided with numerous apertures so that the rods 88 extend through the correct apertures for engagement with the mold pan flange at the optimum positions. Alternatively, the top surface plate 46 may be replaceable or may be substituted for when using assemblies of differing size. In other words, it may be desirable to provide a top surface, suitably insertable in a frame or the like supported by the legs 50, having apertures to receive differently spaced rods of movable members 80 suitable for such differently sized assembly and its associated rods. A series of plates 46, with differing spacing of apertures for accommodating different sized mold pan assemblies 10, may be provided for the proper location of flange 22 relative to push rods 88 with each size of assembly used.

Other means and methods for providing adjustability will be readily apparent to one skilled in the art, and it is not intended to limit the construction of the device described to any particular means or method.

Although a particular environment has been illustrated and described, it will be apparent from the foregoing description that the mold separating device is not limited to the use of ham processing molds. There are many other types of mold uses wherein the separating device can be easily adapted, and it is not intended to limit the invention to the use of ham mold assemblies in this respect.

Thus, a separating device for a two-part mold assembly is provided which is exceedingly simple in its structure and operation. The use of such a device eliminates the messy and difficult problem of separating mold assemblies by hand after the molding process is complete. The use of such device makes the separation of the mold parts

We claim:

1. Mold separating means for a mold having a first part and a second part, said means comprising:
   a support having a plurality of apertures therein, said support being adapted to receive said mold with one of said parts engaging said support adjacent said apertures;
   means for removably securing said one part on said support;
   a movable member mounted on said support and having elongated members extending therefrom and through said apertures and adapted to engage the other of said parts at spaced points therearound;
   and means operatively connected to said movable member for actuating said movable member and moving said moveable member toward said mold and engaging said elongated members with said other part of said mold to separate said other part from said support and said one part.

2. The mold separating means of claim 1 wherein said means for securing said one part on said support includes a bar member extending transversally of said one part and secured thereto, and a pair of spaced hooks secured to said support, said bar being receivable between said hooks and said support and thereby said one part being prevented movement in a direction away from said support.

3. The mold separating means of claim 1 wherein said means for actuating said movable member includes a pressure cylinder mounted on said support and having a reciprocable means contained therein and a rod extending from said means and engaging said movable member, said reciprocable means being movable by an increase of pressure in said cylinder to move said movable member.

4. The mold separating means of claim 3 wherein said rod is secured to said movable member by a ball and socket connection to permit movement of said movable member regardless of the angularity thereof relative to said rod.

5. Mold separating means for a mold having a pan and a cover, said means comprising:
   tubular guide means secured to said pan;
   a bar secured to said cover and in spaced relation thereto and extending transversally thereof;
   guide members on said bar slidably receivable in said guide means;
   a support having a plurality of apertures therein and adapted to receive said mold with said bar engaging said support;
   means on said support for removably securing said bar to said support;
   a moveable member mounted on said support and moveable relative thereto in a direction toward said mold;
   means for moving said moveable member;
   and a plurality of elongated members extending from said movable member and extending through said apertures in said support and engageable with said pan, said members being moveable toward said mold with actuation of said moveable member to move said pan away from said support and said cover.

6. The mold separating means of claim 5 wherein said means for moving said movable member includes a pressure cylinder mounted on said support and having a reciprocable piston contained therein and a rod extending from said piston and engaging said movable member, said piston being movable by an increase of pressure in said cylinder to move said movable member.

7. The mold separating means of claim 6 wherein said rod is secured to said movable member by a ball and socket connection to permit movement of said movable member regardless of the angularity thereof relative to said rod.

8. In combination:
   a first mold part having an outwardly directed peripheral flange;
   a second mold part receivable in said first mold part;
   a support having a plurality of apertures therein, said support being adapted to receive said mold with one of said parts engaging said support adjacent said apertures;
   means for removably securing said one part on said support;
   a movable member mounted on said support and having a plurality of elongated members extending therefrom and through said apertures in said support and adapted to engage the other of said parts at spaced joints therearound;
   and means operatively connected to said movable member for actuating said movable member and engaging said elongated members with said other part to separate said other part from said support and said one part.

9. The mold separating means of claim 8 wherein said means for securing said one part on said support includes a bar member extending transversally of said one part and secured thereto, and a pair of spaced hooks secured to said support, said bar being receivable between said hooks and said support and thereby said one part being prevented movement in a direction away from said support.

10. The mold separating means of claim 8 wherein said means for actuating said movable member includes a presure cylinder mounted on said support and having a reciprocable piston contained therein and a rod extending from said piston and engaging said movable member, said piston being movable by an increase of pressure in said cylinder to move said movable member.

11. The mold separating means of claim 10 wherein said rod is secured to said movable member by a ball and socket connection to permit movement of said movable member regardless of the angularity thereof relative to said rod.

12. Mold separating means for a mold having a first part and a second part, said means comprising:
   a support having a plurality of apertures therein, said support being adapted to receive said mold with one of said parts engaging said support adjacent said apertures;
   means for removably securing said one part on said support;
   elongated members secured to said support and being extensible through said apertures, said elongated members being adapted to engage the other of said parts at spaced points therearound;
   and means operatively connected to said elongated members for extending said members through said apertures to engage said other part and separate said other part from said support and said one part.

References Cited by the Examiner

UNITED STATES PATENTS

| | | | |
|---|---|---|---|
| 270,716 | 1/83 | Wohnlich | 29—200 |
| 1,768,049 | 6/30 | Gill | 29—200 |
| 2,304,927 | 12/42 | Kane | 29—252 X |
| 3,067,498 | 12/62 | Tomka | 29—208 |

WHITMORE A. WILTZ, *Primary Examiner.*

THOMAS H. EAGER, *Examiner.*